(12) United States Patent
Jähnig et al.

(10) Patent No.: US 8,752,495 B2
(45) Date of Patent: Jun. 17, 2014

(54) FLOATING FOUNDATION FOR MASS PRODUCTION

(75) Inventors: Jens Jähnig, Dorfhain (DE); Alexander Zacharias, Dresden (DE)

(73) Assignee: Jaehnig GmbH Felssicherung und Zaunbau, Dorfhain (DE)

(*) Notice: Subject to any disclaimer, the term of this patent is extended or adjusted under 35 U.S.C. 154(b) by 85 days.

(21) Appl. No.: 13/553,249

(22) Filed: Jul. 19, 2012

(65) Prior Publication Data

US 2013/0019792 A1    Jan. 24, 2013

(30) Foreign Application Priority Data

Jul. 21, 2011   (DE) .......................... 10 2011 052 024

(51) Int. Cl.
  *B63B 35/44*   (2006.01)
(52) U.S. Cl.
  USPC ......................................................... 114/264
(58) Field of Classification Search
  USPC ......................................... 114/264, 265, 267
  See application file for complete search history.

(56) References Cited

U.S. PATENT DOCUMENTS

| | | | |
|---|---|---|---|
| 7,156,586 B2 | 1/2007 | Nim | |
| 7,476,074 B2 * | 1/2009 | Jakubowski et al. | ............. 415/1 |
| 2005/0206168 A1 | 9/2005 | Murakami et al. | |
| 2011/0155038 A1 | 6/2011 | Jähnig et al. | |

FOREIGN PATENT DOCUMENTS

| | | |
|---|---|---|
| DE | 10 2008 003 647 A1 | 7/2009 |
| EP | 1 288 122 A2 | 3/2003 |
| EP | 1 876 093 A3 | 1/2008 |
| GB | 2 378 679 A | 2/2003 |
| WO | 2004/055272 A2 | 7/2004 |
| WO | 2007096680 A1 | 8/2007 |
| WO | 2011/057940 A2 | 5/2011 |

* cited by examiner

*Primary Examiner* — Edwin Swinehart
(74) *Attorney, Agent, or Firm* — Michael Soderman

(57) ABSTRACT

A floating structure has an annular support as an underwater support with a buoyant body. A tower penetrates the annular support centrally and is connected to the annular support at a location underneath the annular support by slantedly outwardly ascending tension spokes and at a location above the annular support by slantedly outwardly descending tension spokes. Anchors on the ocean floor are connected by tension elements with the annular support. The structure is built by the steps of supporting by auxiliary devices the annular support on a floor of a basin that can be flooded; positioning the tower at the center of the annular support in vertical position; attaching the tension spokes at the annular support and at the tower; flooding the basin; towing the structure to its desired final position; and lowering and anchoring the structure in a submerged floating position.

4 Claims, 7 Drawing Sheets

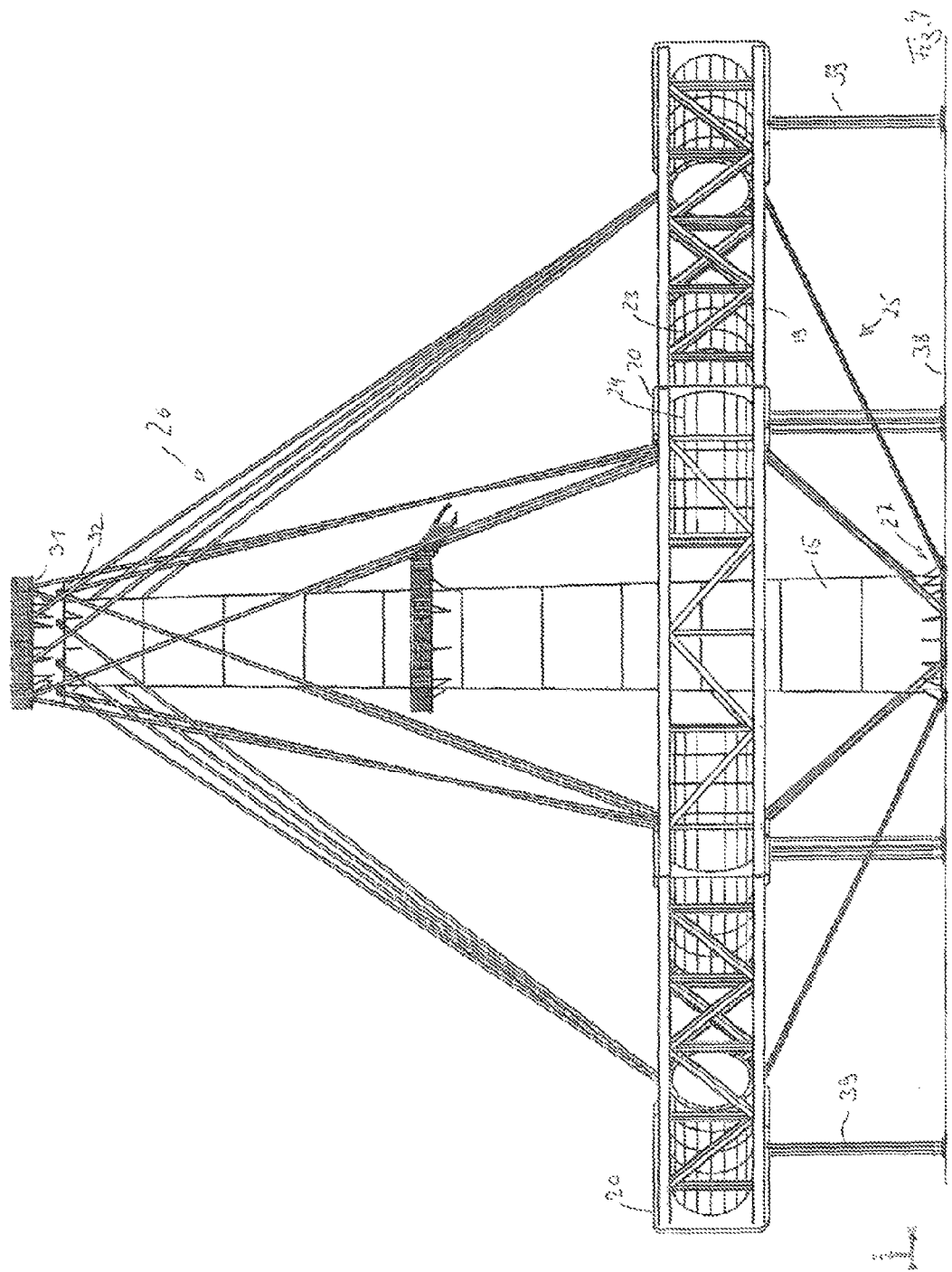

FLOATING FOUNDATION FOR MASS PRODUCTION

BACKGROUND OF THE INVENTION

The invention concerns a floating foundation and a method for its manufacture.

In particular for erecting wind power plants, but also for anchoring other structures in the ocean, for example, marine navigation marks, drilling platforms and the like, numerous variants of floating foundations have been proposed. They are based on buoyant bodies which, in the immersed state, provide buoyance that is significantly greater than the weight of the structure and of the load to be carried wherein the buoyant bodies are anchored by cables or chains to the ocean floor in the submersed state.

For example. GB 2 378 679 discloses such a floating foundation for a wind power plant. It is comprised of several buoyant bodies that are connected by means of radial steel beams to the tower. In plan view, the steel beams are arranged in crossing arrangement and are not connected to each other.

When bending forces are acting on the radial steel beams of the structure, they cause high bending moments.

WO 2007/096680 proposes a modified construction with a floating foundation that is quadrangular in plan view. The buoyant bodies that are arranged at the corners are connected to each other by tie rods and compression bars to a three-dimensional support structure. A central large buoyant body supports a tower that is braced by inclined cables to the outwardly positioned buoyant bodies.

Even though in connection with this structure it is said that it is subjected to only minimal oscillations, a high constructive expenditure is required.

U.S. Pat. No. 7,156,586 B2 proposes a floating support structure that has arms extending radially away from a tower. They are provided at their ends with buoyant bodies. For stabilizing the tower position, inclined cables are tightened between the buoyant bodies and the tower.

At the central base of the tower, stress concentrations result that may cause problems; but, at least, they will increase the construction expenditure.

EP 1 288 122 A2 proposes a floating support structure in the form of a massive floating platform with several chambers that, like a diving bell, are filled with air and therefore can be utilized to produce buoyance.

The erection of such a floating foundation requires a high material expenditure.

Moreover, EP 1 876 093 A3 as well as DE 10 2008 003 647 propose floating support structures in which the buoyant bodies are provided on ends that extend radially away from a central structure.

It is the object of the invention to provide a concept with which ire a simple and reliable way floating support structures can be produced.

SUMMARY OF THE INVENTION

This object is solved with the floating structure with an annular support as an underwater support with at least one buoyant body; a tower that penetrates the annular support centrally and that is connected to the annular support at a location underneath the annular support by slantedly outwardly ascending tension spokes as well as at a location above the annular support by slantedly outwardly descending tension spokes; and anchors on the ocean floor connected by means of tension means with the annular support as well as the method comprising the steps of supporting by auxiliary devices the annular support on a floor of a basin that can be flooded; positioning the tower at the center of the annular support in vertical position; attaching the tension spokes at the annular support and at the tower; flooding the basin; towing the structure to its desired final position; and lowering and anchoring the structure in a submerged floating position.

The structure according to the invention has an annular support that has at least one, preferably however several buoyant bodies. The annular support is thus in the simplest case a self-contained tubular annular body with a round or polygonal footprint and a round or polygonal cross-section. It is comprised of steel, concrete or another suitable material. In this case, buoyant bodies and support structure of the annular support are joined with each other to a unit. Preferably, the annular support however comprises several buoyant bodies wherein support structure and buoyant bodies are embodied separate from each other as individual elements. For example, the annular support can be a lattice truss, i.e., a three-dimensional framework. The individual bars of this framework can be profiled steel rods, such as, for example, angle sections, I-sections, or the like or also tubular sections. Preferably, the annular support in plan view is framed polygonally so that straight rods can be used for its production.

The buoyant bodies are, for example, single-chamber or multi-chamber hollow bodies that are made of concrete or steel. Preferably, they are arranged within a space that is enclosed and bounded by the frame work of the annular support. This provides a certain impact protection with regard to light collisions with watercraft or submerged watercraft or other objects. Also, an additional safety with respect to average is provided should buoyant bodies become detached from the annular support. They will not completely separate from the annular support and therefore will also not lose their carrying function. This lowers the constructive expenditure.

The buoyant bodies are preferably flange-connected to vertically arranged support walls on which individual lattice truss segments of the annular support are attached. The support walls absorb most of the forces that are acting on the structure. Here, the buoyant forces of the buoyant bodies meet the securing forces of the anchoring cables or chains provided as tie means that are extending to the ocean floor, as well as additional forces that are transmitted by the tension spokes onto the support walls.

The load of the tower is preferably transmitted exclusively by tension spokes onto the annular support. This concerns the weight as well as the pitch moments of the tower and the yaw moments. The tension spokes are preferably freely tensioned, i.e., are only connected with their ends to other elements in a force-transmitting way. The annular support and the tower form together with the tension spokes a pre-tensioned unit, i.e., a unit that is stiffened by symmetric tensions. This is not conflicting with the tower possibly being connected by means of further non-load bearing elements with the buoyant bodies, for example, by one or several manway pipes that may be, for example, radially arranged. The manway pipes can be flexibly designed or can be provided with joints, bellows or the like.

At a location that is underneath the annular support, tension spokes are connected to the tower that ascend at a slant outwardly. They carry the load of the tower and transmit this load purely as tension force onto the annular support, i.e., preferably the support walls thereof.

At a location that is above the annular support, tension spokes are arranged that are arranged at a slant outwardly and sloped downwardly toward the support walls which secure the tower in the vertical position, i.e. brace it.

The tension spokes that are slanted downwardly toward the tower are positioned at a first angle relative to the horizontal. The tension spokes that are ascending toward the tower are positioned at a second angle to the horizontal. Preferably, the first angle is smaller (preferably significantly) than the second angle.

The material expenditure for producing the tension spokes is quite minimal. The tension spokes are pure tension elements, for example, in the form of slim rods, steel sections, pipes, bars, cables, chains or the like with or without corrosion protection coating. Uniform elements but also different elements may be used for the tension spokes of the two groups. The tension spokes are connected with their two ends preferably in an articulated fashion with the tower and the buoyant body. However, the tension spokes can also be rigidly attached with their ends to the tower and/or the annular support. However, they are then preferably elastically or bendable to such an extent that the weight force of the tower as well as the possibly occurring pitch moments and torques between the tower and the annular support can be transmitted exclusively, or at least quite predominantly, as tension forces via the tension spokes.

As a whole, a lightweight structure is created, which can be produced with minimal material expenditure, can be easily pre-manufactured, is stable and insensitive to outer disturbing influences, by means of which even technical devices subjected to high dynamic loads, such as wind power plants, can be stably anchored at sea. The water depth is only of subordinate importance in this context. For anchoring, only fixed securing points on the ocean floor are required. For this purpose, it is possible to employ ram pile anchors as well as, which is preferred, gravity foundations, for example, according to EP 2 036 814 A1. Also, a combination between ram pile anchors and gravity foundations can be employed.

By anchoring the tower at the annular support by means of a group of first tension spokes that ascend the tower toward the annular support and a second group of tension spokes that are attached above the annular support to the tower and brace it in downward direction, the structure has a basic elasticity by which the structure near-shore as well as in areas remote from the shore is in particular capable of withstanding loads that occur at high wind speeds and rough seas. Pulsating, rhythmically repeating, but also stochastic loads are absorbed and diverted without disruptive stress concentrations.

The advantages of the structure according to the invention lie not only in their constitution in the erected state but also in its ease of construction. It can be erected with minimal expenditure in a very short construction time, for example, in a drydock. The latter comprises a basin that is filled with water or emptied as needed and that enables access to the ocean. The annular support and the buoyant bodies can be premanufactured in total or in parts. The floating support is positioned at a proper height above the ground of the drydock, for example, on blocks or movable props. The preferably premanufactured tower is then positioned, for example, by means of a crane, centrally and vertically in the annular support. Is it then only necessary to attach the tension spokes which can be done with extremely minimal personnel and machine expenditure by producing a few screw connections. After completion of the straightforward and short building process, the temporary support of the annular support can be removed, the basin can be flooded, and the structure can be towed to its installation site. It is then anchored there and is ready to use. The annular support can be assembled form uniform lattice segments, uniform support walls and uniform buoyant bodies. The uniform elements can be preassembled in mass production and can be transported by road because of their manageable dimensions.

BRIEF DESCRIPTION OF THE DRAWINGS

Further details and advantageous embodiments of the invention result from the description of one embodiment, from the Figures of the drawing, and the claims. It is shown in:

FIG. 7 the structure according to FIG. 1 during erection in the drydock in a detail view that is partially simplified.

DESCRIPTION OF PREFERRED EMBODIMENTS

Figure 1:
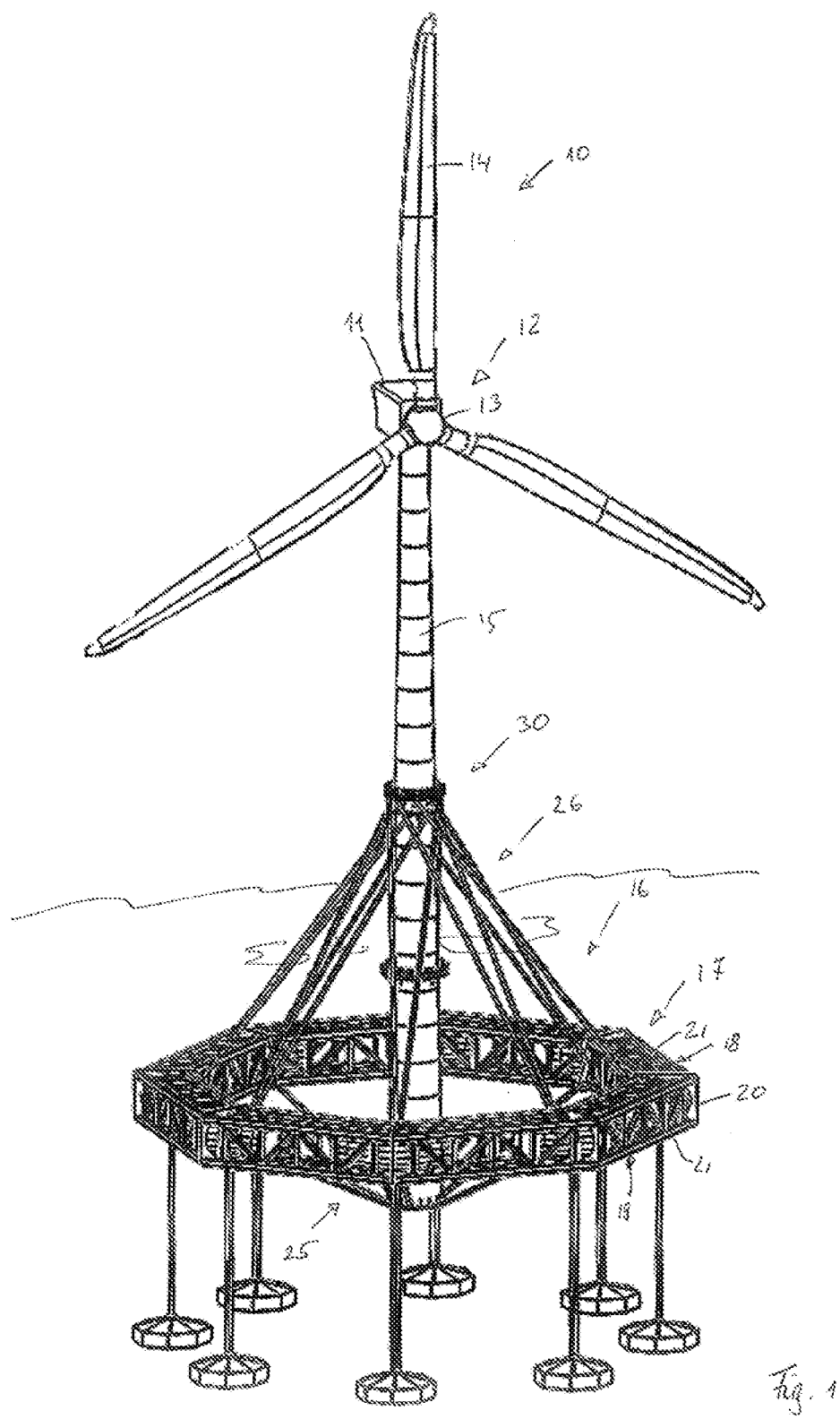
FIG. 1 a structure according to the invention embodied as an offshore wind power plant.

As an example of a structure 10 according to the invention, FIG. 1 illustrates a wind power plant. The latter comprises a nacelle 11 with rotor 12 comprising a hub 13 from which at least one, preferably however several, rotor blades 14 extend away. The hub 13 is supported rotatably about an approximately horizontal axis while the nacelle is arranged so as to be pivotable about a vertical axis on the upper end of the vertically arranged tower 15. Other structures can be erected according to the same principle in as much as they comprise a central tower that extends from below the water surface to at least somewhat above the latter and that supports a load thereat.

The tower 15 is supported by a floating foundation 16 wherein the lower part of the tower 15 is a functional component of the floating foundation 16. The floating foundation 16 moreover comprises an annular support 17 which, in the illustrated embodiment, is a lattice truss. It is of a circular ring-shape or, as illustrated, can also be polygonal, for example, triangular, quadrangular, pentagonal, hexagonal, or heptagonal, octagonal as illustrated, or even embodied with more corners. Preferably, it is comprised of several straight lattice truss segments 18, 19 or also other compression-stiff horizontally arranged supports that are made of steel, sheet steel, concrete or even plastic and are connected to each other at the corners of the polygon. For this purpose, they can be attached, for example, to vertically arranged support walls 20. The support walls 20 are arranged at the corners of the polygonal annular support 17 preferably vertically and radially oriented. They are comprised, for example, of appropriately thick sheet steel and form nodes for the forces that are to be transmitted from the tower 15 onto the annular support 17. Instead of the support sheets 20, also other connecting means, for example, individual flanges, hollow bodies, three-dimensional lattice truss structures or the like can be provided.

Figure 3:
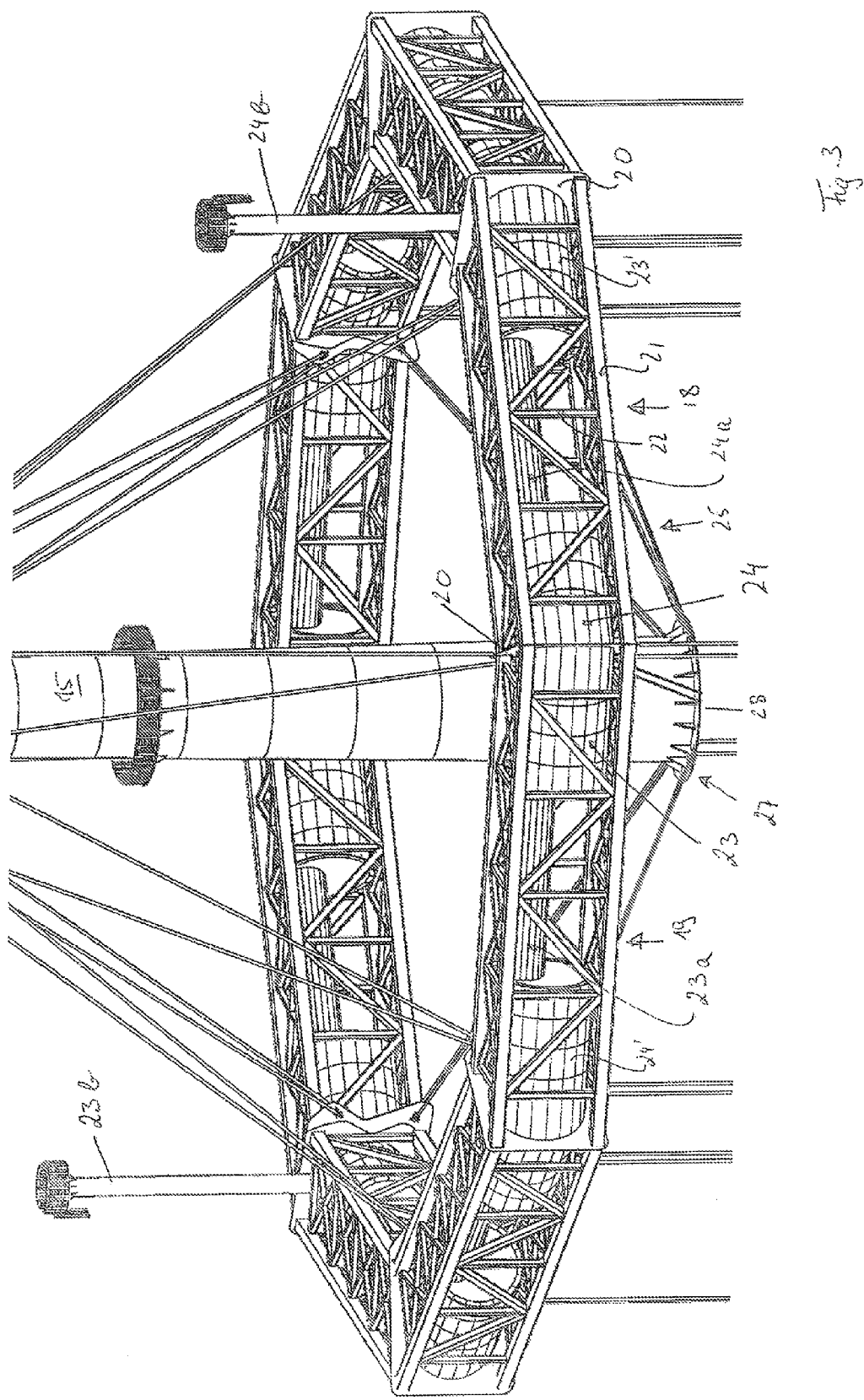
FIG. 3 the structure according to FIG. 1 in a perspective detail view.

Each lattice truss segment 18, 19 is preferably embodied as a compression-stiff segment. For example, as illustrated, it can have a rectangular or square cross-section but alternatively also a triangular cross-section, a pentagonal cross-section or a polygonal cross-section. Accordingly, it has four, three or five or several horizontal compression supports 20 which are connected to each other by a triangular truss structure 22. FIG. 3 illustrates one embodiment.

Figure 5:
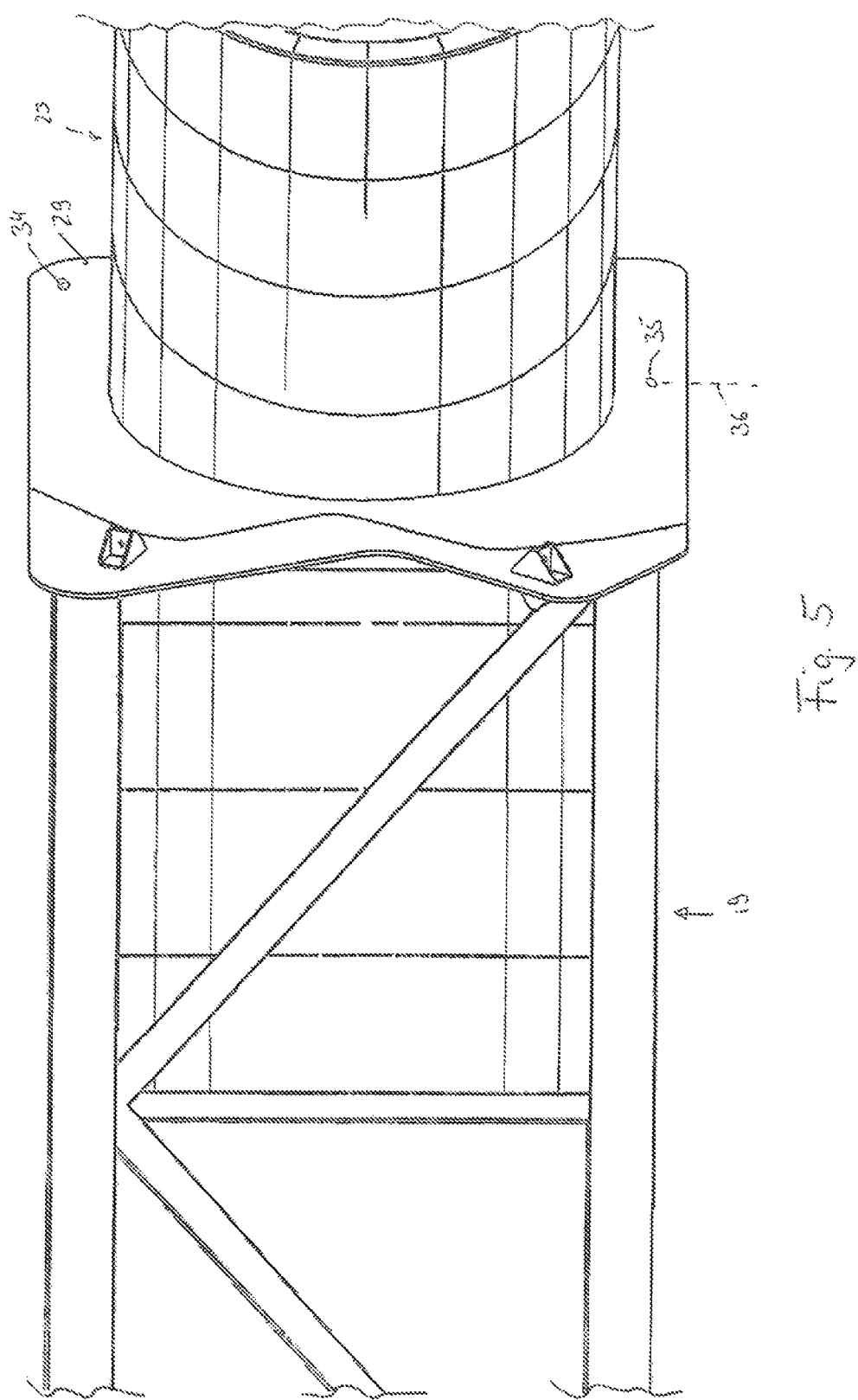
FIG. 5 a buoyant body and a partition of the structure according to FIG. 1.

The space that is enclosed by the lattice truss segments 18, 19 can be at least partially utilized for accommodating buoyant bodies 23. Such a buoyant body 23 is illustrated in FIG. 5 together with the support wall 20. The support wall 20 is preferably provided at both of its flat sides with buoyant bodies, e.g. a buoyant body 23 and a buoyant body 24, as shown in FIG. 3. The buoyant bodies 23 and 24 are constructed relative to each another mirror-symmetrically so that they generate the same buoyance. In an especially preferred case they are identical with each other. The same holds true also for the lattice trusses 18, 19 and all other lattice trusses. These are preferably also identical with each other. In this way, the annular support 17 can be assembled of an appropriate number of lattice truss segments 18, support walls 20, and buoyant bodies 23 18 pre-manufactured according to the same pattern in series. Assembly can be realized by producing connections between the support sheets 20 and the buoyant bodies 23, 24 as well as subsequent attachment of the lattice trusses 18, 19. As a joining technology, connecting by screws, by weld seams welding or rivets is suitable.

The buoyant bodies 23, 34 are hollow bodies that are comprised preferably of sheet steel whose interior may be divided into segments that are partitioned off relative to each other. The interiors can be designed as walk-in spaces, for example, machine rooms. Aside form steel, the buoyant bodies can be also comprised of other materials, for example, concrete or plastic or a mixed material construction. The buoyant bodies different 23, 24' and 24, 23' nodes or corners can be connected with each other by connecting pipes 23a, 24a. These connecting pipes 23a, 24a can also be designed as walk-in pipes. As needed, water-tight doors (bulkheads) can be provided in order to close the connection between the buoyant bodies 23', 24 and 24', 23. When all buoyant bodies are connected to each other in this way, a walk-in ring is provided.

One or several access pipes 23b, 24b may project upwardly from the floating foundation 16 that enable access to the buoyant bodies 23, 24. They end above the water surface and have thereat a closable access hatch. Alternatively, one or several access pipes can create a walk-in connection between at least one of the buoyant bodies 23, 24 and the tower. For this purpose, such an access pipe can be arranged approximately horizontally and radially. Preferably, it is flexible or contains articulated or flexible sections in order to decouple the tower and the buoyant bodies 16 with regard to forces.

Figure 2:
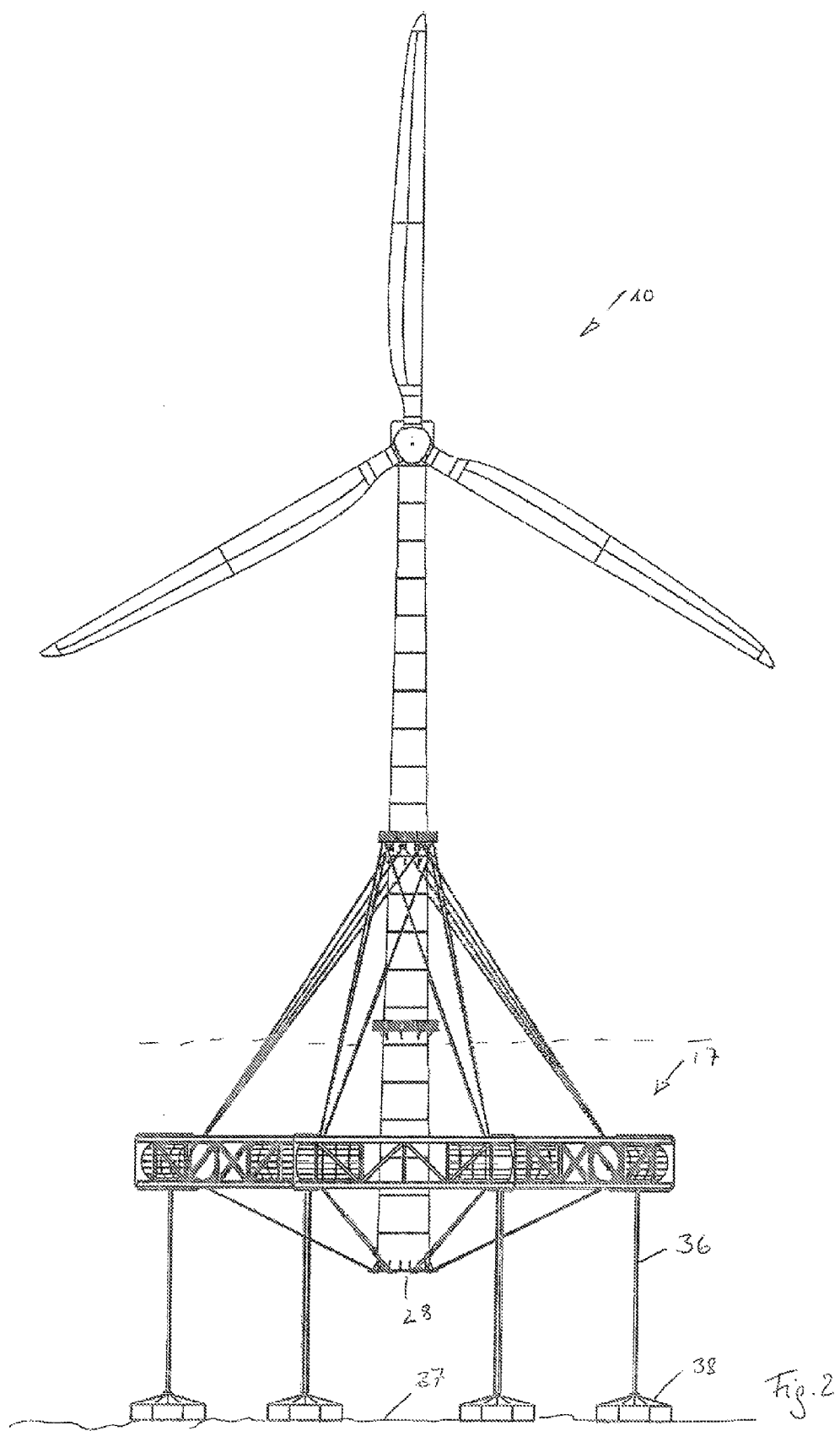
FIG. 2 the structure according to FIG. 1 in a detail side view.

The floating foundation 16 also includes tension spokes 25 of a first group and tension spokes 26 of a second group. The tension spokes 25 of the first group are embodied e.g. as profiled rods, cables, bars, chains or other tension-proof elements. Their compression resistance is of subordinate importance. As can be seen in FIGS. 1, 2, and 7, they are connected with a first end at a location 27 of the tower 15 that is below the annular support 17. This location 27 is for example, formed by an annular flange 28 (see FIG. 3) that extends radially away from the tower 15 and that can be connected by joint plates exiting with the tower 15.

The annular flange 28 is arranged at the lower end of the tower 15 or also at a location in the vicinity of the lower end of the tower 15. Alternatively, instead of the annular flange 28, another anchoring center may be provided, for example, in the form of a tapering cone-like projection that continues downwardly away from the lower tower end 15 having at its wall or tip appropriate anchoring possibilities for the tension spokes 25.

The tension spokes 25 are connected at the location 27 preferably in articulated fashion and extend, beginning at the location 27, in an ascending fashion to the annular support 17. Here they are anchored preferably on the support walls 20 preferably in articulated fashion, FIG. 5 shows an appropriate support wall a radial section 29 projecting inwardly past the lattice truss segments 18, 19 (see also FIG. 4) where the tension spokes of the first group 25 are anchored.

The tension spokes of the first group 25 are preferably arranged in a vertical radial plane of the structure 10. This plane contains the center axis of the tower 15 as well as the support wall 20. The tension spokes 25 of the first group are preferably arranged within this radial plane. In this way, the tension spokes of the first group absorb primarily tensile stress that is caused by the weight of the tower 15 and of the wind power plant supported by it. Alternatively, or additionally, at least some of the tension spokes of the first group 25 can be arranged at an acute angle relative to the respective vertical radial plane in order to inhibit also a rotation of the tower 15 relative to the annular support 17 about the vertical axis. Preferably, however, this is not the task of the lower tension spokes 25 but of the upper tension spokes 26.

Figure 4:
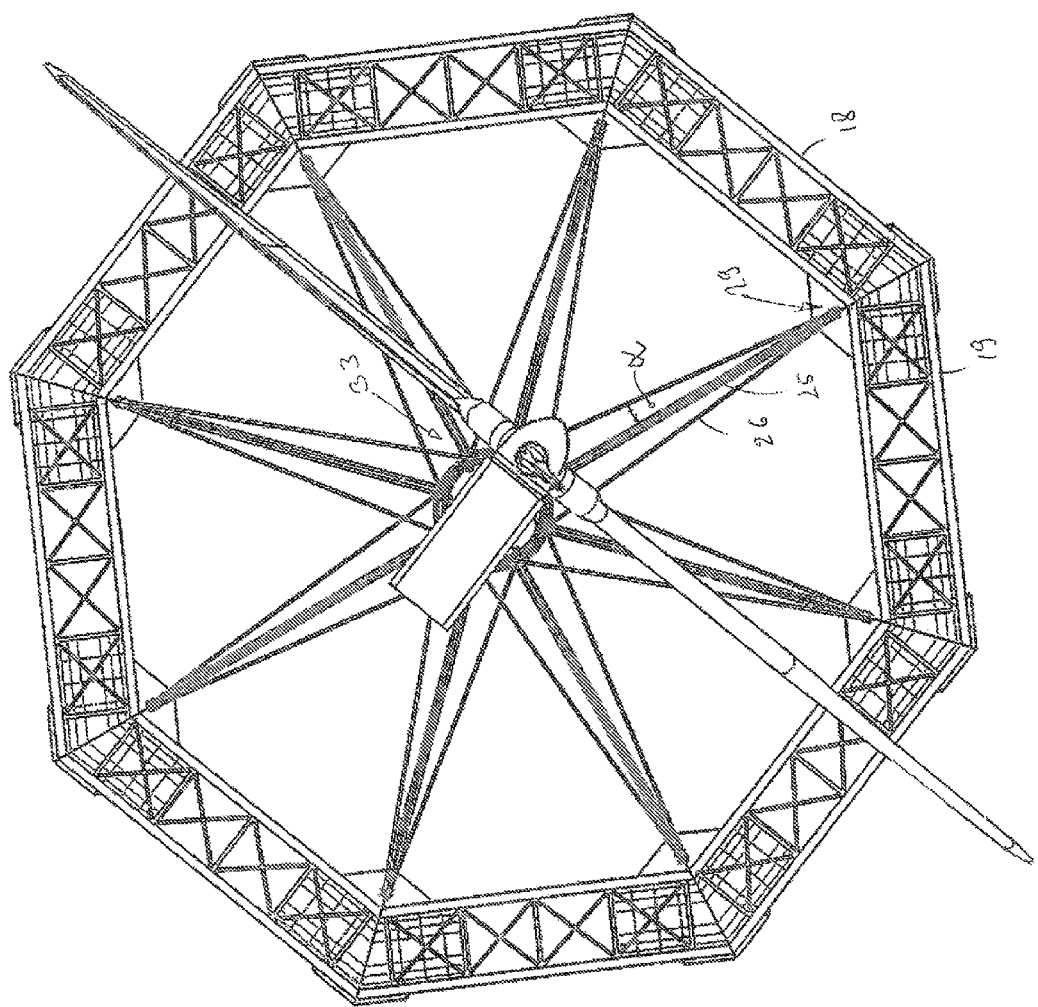
FIG. 4 the structure according to FIG. 1 viewed from bottom to top.

The tension spokes 26 of the second group are attached in an articulated fashion with one end, respectively, at a location 30 of the tower 15 above the annular support 17, this location preferably being also above the waterline. As can be seen in FIGS. 1, 2, 7, in particular however in FIG. 6, for this purpose on the tower 15 appropriate consoles 31, 32 embodied e.g. as flanges can be provided. These consoles 31, 32 can also be replaced by other anchoring means. Preferably, the tension spokes 26 of the second group are positioned at an acute angle α relative to the vertical radial plane. This is shown in FIG. 4. While the tension spokes 25 of the lower group in this view extend radially, the tension spokes 26 of the upper group are arranged thereto at an acute angle α. In this way, the transmission of torque that may act about the vertical axis of the tower 15 is effected from the tower onto the annular support 17 and vice versa. For assisting in this torque transmission, the radius of the consoles 31, 32 can be enlarged, as needed. While the tension spokes of one partial group transmit only right-handed torque about the tower axis, the tension spokes of the other partial group transmit only left-handed torque about the axis of the tower.

Figure 6:
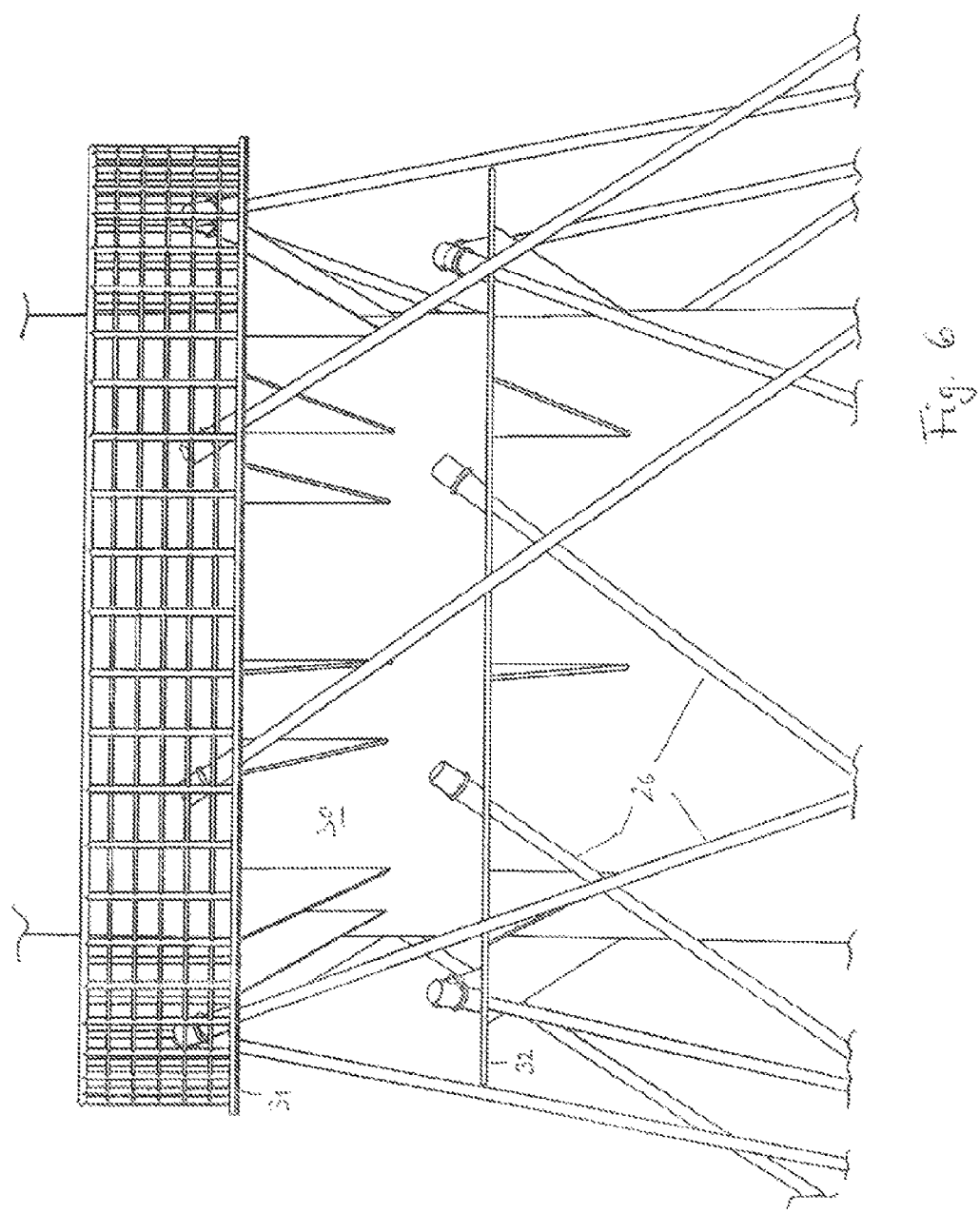
FIG. 6 a tower section with tension spokes of the structure according to FIG. 1 in a perspective view.

The tension spokes 26 of the upper group are preferably, as mentioned, divided into two partial groups. The spokes of the first partial group are connected with the upper console 31 while the tension spokes of the second partial group are connected to the console 32 arranged underneath. While the tension spokes extend away from the first console 31 in a first rotational direction, the tension spokes extend away from the second console 32 in another second rotational direction. In this way, the spokes of the first and the second partial groups cross each other as can be seen in FIG. 6 as well as FIG. 4, example at the location 33. As a result of the height displacement of the consoles 31, 32 the tension spokes of the group 26 do not contact each other here. The height displacement is selected such that contact cannot occur even when an oscillating load is acting on the structure 10 as may be the case at high seas or wind.

The tension spokes 26 of the two partial groups extend in pairs at a downward slope relative to each other toward the support wall 20 and are connected thereat at the section 29 shown in FIG. 5 at an upper anchoring point 34 preferably in an articulated fashion.

While the tension spokes 25 of the first group are arranged at a minimal incline of 10 degrees to 50 degrees to the horizontal, the spokes 26 of the second group are arranged at a greater incline of 30 degrees to 85 degrees to the horizontal. In this way, the structure 10 has sufficient depth of floatation, on the one hand, and a high swaying stability of the tower is provided, on the other hand.

On the support wall 20 (see FIG. 5) there are also one or several anchoring points 35 for connecting an anchoring cable 36 as a tension means. It is extended to securing points at the ocean floor 37. Such securing points can be, for example, created by anchor weights 38, so-called gravity anchors, but also by ram pile anchors or the like.

The buoyant bodies 23, 24 as well as the tower 15 are designed as buoyance-generating hollow bodies whose buoyance as a whole is so large that the weight of the structure 10 is surpassed greatly. In this way, the annular support 17 that in operation is submerged is prevented by the anchoring cables 36 from floating to the surface and forms thus a fixed platform for the wind power plant or any other offshore structure. The tower of the window power plant is attached on the annular support by means of the tension spokes 25 in a "suspended" manner and is braced by the tension spokes 26.

The buoyant bodies 23, 24 are preferably chambered or unchambered hollow bodies which may be connected to each other at the support wall 25 by a manhole or other passageways. However, as needed, closable bulkheads can be provided. In the buoyant bodies 23, 24 structures such as, for example, winches or the like can be provided. For example, instead of fixed anchoring points 35 for the anchoring cables 36, movable anchoring devices with winches, brakes, clamping devices and the like can be provided. In this way, it may be made possible to enable the structure 10 to climb up and down at the anchoring cables 36 in a targeted fashion. Also, winches or like devices may compensate swaying of the annular support 17 at high seas, current or wind load or the like in a targeted way or may counteract such movements.

Moreover, it is possible, to utilize in particular the lower end of the tower 15 and here in particular the section thereof that is beneath the water line as a machine room. Particularly heavy facility components such as transformers, auxiliary apparatus or the like can be housed here.

For erecting the structure according to FIG. 1, the following procedure can be followed. FIG. 7 illustrates an empty dry dock; on its bottom 38 first the buoyant body 17 that is supported by auxiliary devices 39 has been erected. The auxiliary devices 39 are, for example, simple studs, hydraulic devices or the like. Preferably, all support walls 20 are supported by appropriate auxiliary devices 39. Between the support walls 20 the lattice truss segments 18, 19 and, on the support walls 20, the buoyant bodies 23, 24 have been mounted. The tower 15 is erected prior to mounting the annular support 17 or after its assembly. The latter can be comprised, for example, of several segments connected to each other. As soon as the lowermost segment has been arranged at its proper place on the bottom 38, the tension spokes 25 of the first group can be attached. When the tower as a whole is lifted to its position, immediately after assembly of the tension spokes 25 also the tension spokes 26 can be mounted. When the tower 15 is however erected sequentially section by section, the tension spokes 26 can be mounted as soon as the segment of the tower 15 supporting the consoles 31, 32 is mounted.

It is possible to premanufacture the entire wind power plant including nacelle 11 and rotor 12 in the drydock. When flooding the dock, the structure 10 will float and can be towed out of the dock to its site of installation. Here it is anchored and lowered.

The structure 10 according to the invention provided for erection at sea has an annular support 17 provided with buoyant bodies 23, 24 and arranged concentrically to the tower 15 belonging to the structure 10. Tension spokes 25, 26 connect the tower 15 with the annular support 17. The tension spokes 25, 26 are not bending-stiff. The force transmission between the tower 15 and the annular support 17 is realized exclusively by tension forces in a technically relevant range. Bending forces, torsion moments and the like are negligible. A structure is provided that is easy to erect, robust, and little disturbance-prone.

What is claimed is:

1. A floating structure comprising:
a) an annular support as an underwater support with at least one buoyant body,
b) a tower penetrating the annular support centrally that is connected to the annular support at a first location underneath the annular support via first tension spokes ascending outwardly at a slant and that is connected to the annular support at a second location above the annular support via second tension spokes descending outwardly at a slant, wherein
at least some of the tension spokes are arranged at an acute angle to a perpendicular radial plane that extends through outer anchoring points of the tension spokes and
two vertically spaced consoles are provided for anchoring the tension spokes to the second location of the tower above the annular support,
and
c) anchors on an ocean floor connected by tension elements to the annular support.

2. A floating structure comprising:
a) an annular support with a polygonal shape as an underwater support with
at least one buoyant body,
tension spokes connected to the corners,
vertical support walls at the corners that are connected to one another in pairs via lattice truss segments,
several buoyant bodies that are arranged on the vertical support walls,
b) a tower penetrating the annular support centrally that is connected to the annular support at a first location underneath the annular support via first tension spokes ascending outwardly at a slant and that is connected to the annular support at a second location above the annular support via second tension spokes descending outwardly at a slant,
and
c) anchors on an ocean floor connected by tension elements to the annular support.

3. A floating structure comprising:
a) an annular support as an underwater support with
at least one buoyant body,
vertical support walls at its corners that are connected to one another in pairs via lattice truss segments,
several buoyant bodies that are arranged on the vertical support walls and that extend into the interior of the lattice truss segments,
wherein the buoyant bodies are surrounded by the lattice truss segments,
b) a tower penetrating the annular support centrally that is connected to the annular support at a first location underneath the annular support via first tension spokes ascending outwardly at a slant and that is connected to the annular support at a second location above the annular support via second tension spokes descending outwardly at a slant,
and c) anchors on an ocean floor connected by tension elements to the annular support.

4. A floating structure comprising:
a) an annular support as an underwater support with vertical support walls at its corners that are connected to one another in pairs via lattice truss segments,
several buoyant bodies that are arranged on the vertical support walls and that extend into the interior of the lattice truss segments,
at least two buoyant bodies that are connected to each other by a walk-in pipe,
b) a tower penetrating the annular support centrally that is connected to the annular support at a first location underneath the annular support via first tension spokes ascending outwardly at a slant and that is connected to the annular support at a second location above the annular support via second tension spokes descending outwardly at a slant,
and
c) anchors on an ocean floor connected by tension elements to the annular support.

* * * * *